No. 786,182. PATENTED MAR. 28, 1905.
C. BARGAMIN.
CUT-OFF ATTACHMENT FOR GAS STOVES.
APPLICATION FILED JUNE 24, 1904.
2 SHEETS—SHEET 1.
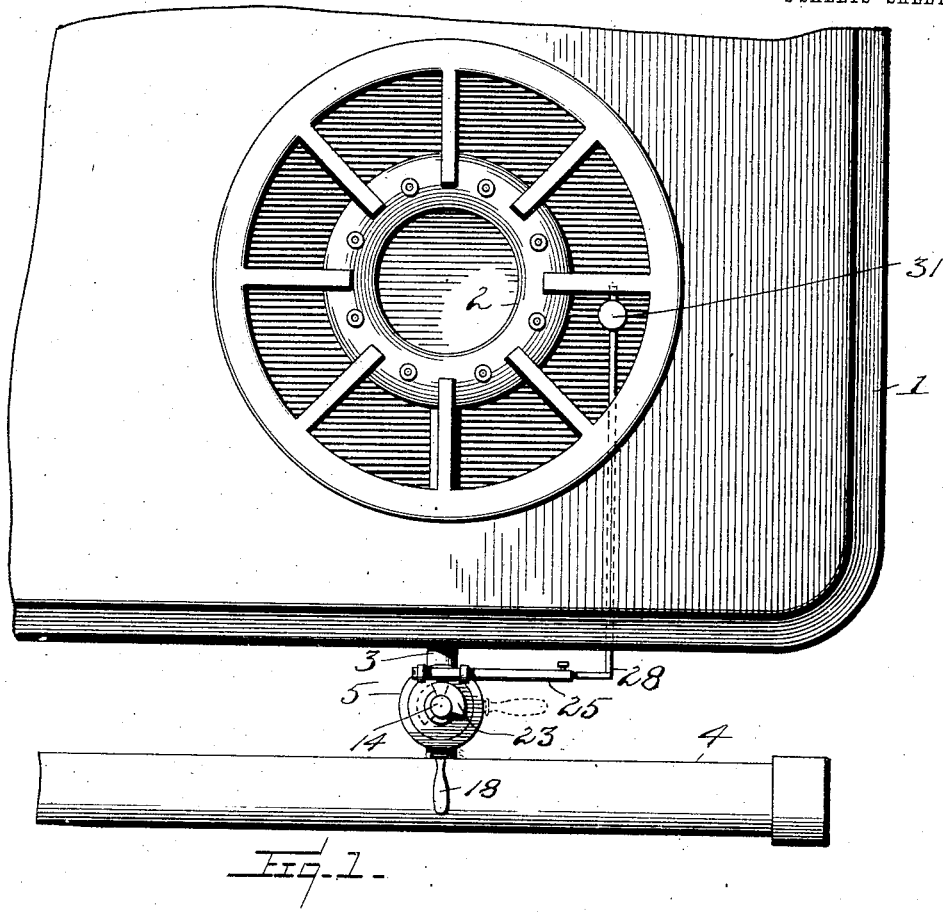
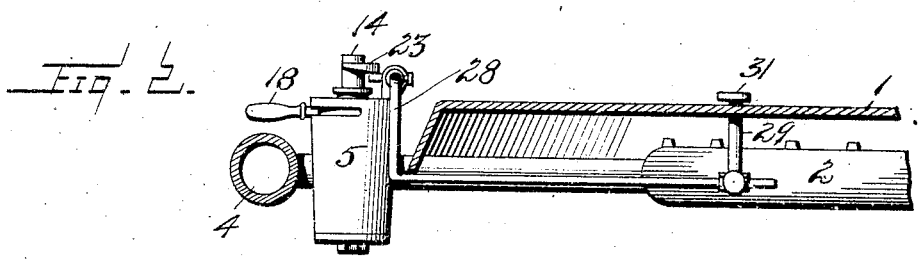
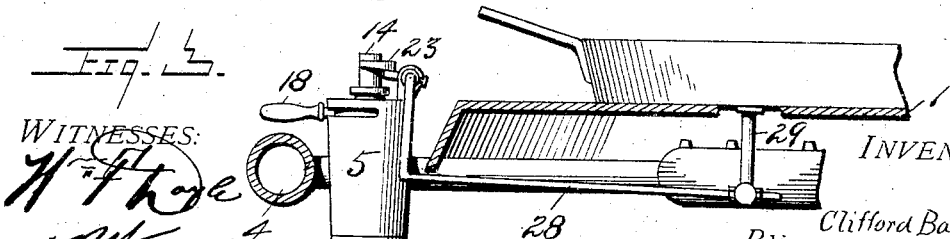
INVENTOR
Clifford Bargamin
BY
Rexford M. Smith
Attorney No. 786,182. PATENTED MAR. 28, 1905.
C. BARGAMIN.
CUT-OFF ATTACHMENT FOR GAS STOVES.
APPLICATION FILED JUNE 24, 1904.
2 SHEETS—SHEET 2.
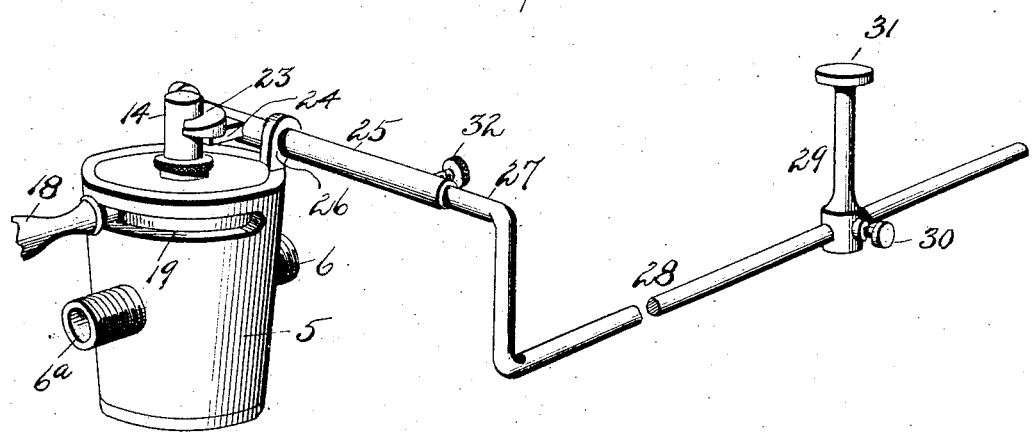
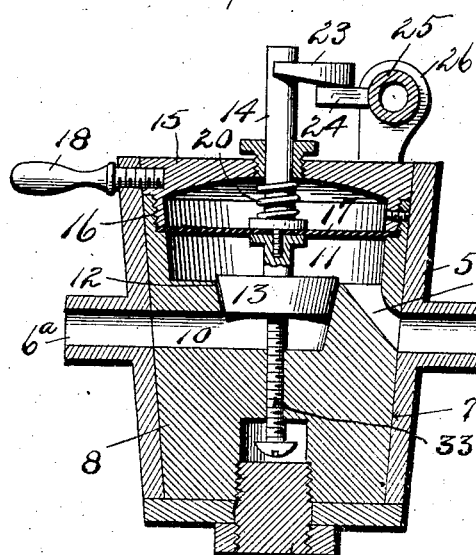
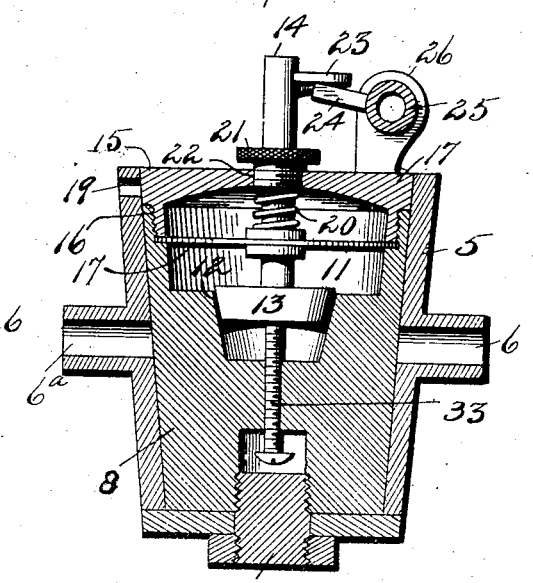
WITNESSES:
INVENTOR
Clifford Bargamin
BY
Attorney No. 786,182. Patented March 28, 1905.

UNITED STATES PATENT OFFICE.

CLIFFORD BARGAMIN, OF NEWPORT NEWS, VIRGINIA, ASSIGNOR TO THE NOVELTY MANUFACTURING CORPORATION, OF NEWPORT NEWS, VIRGINIA.

CUT-OFF ATTACHMENT FOR GAS-STOVES.

SPECIFICATION forming part of Letters Patent No. 786,182, dated March 28, 1905.

Application filed June 24, 1904. Serial No. 214,005.

*To all whom it may concern:*

Be it known that I, CLIFFORD BARGAMIN, a citizen of the United States of America, residing at Newport News, in the county of Warwick and State of Virginia, have invented a certain new and useful Cut-Off Attachment for Gas-Stoves, of which the following is a specification, reference being had therein to the accompanying drawings.

This invention relates to automatic cut-off attachments for gas-stoves, and has special reference to that type of attachments wherein the flow of gas to the burner is automatically controlled through the placing and removal of the cooking utensils from the stove, thereby economizing in the saving of the gas by providing for the cutting down of the flow when a utensil or vessel is removed from over the burner.

The device is intended to guard against the carelessness and oversight in the use of a gas-stove, so that the full heat can only be turned on when actually needed and the flow cut down or entirely off when a vessel or utensil is removed from the stove without any other attention being required on the part of the user. However, in attachments of this character heretofore devised difficulty has been experienced in the fact that no provision has been made independent of the automatic controlling means for entirely cutting off the supply or flow of gas to the burner in the event of such controlling means becoming deranged or out of order and also from the fact that in such attachments, even when the stove is not in use, the valve-controlling mechanism is exposed to operation by any object that may be accidentally or otherwise placed on the stove, such as a market-basket or the like. The present invention obviates both of these objections to ordinary types of automatic cut-offs for gas-stoves by providing simple and reliable means for entirely cutting off and controlling the flow of gas independent of the automatic controlling means, and also by providing for automatically disposing the controlling means in an inactive plane entirely out of the way when the supply is cut off.

With these and other objects in view the invention consists in the novel construction, combination, and arrangement of parts, as hereinafter fully described, illustrated, and claimed.

The essential features of the invention involved in carrying out the objects above indicated are necessarily susceptible to structural change without departing from the spirit or scope thereof; but the preferred embodiment of the invention is shown in the accompanying drawings, in which—

Figure 1 is a top plan view of a portion of a gas-stove equipped with the improved automatic cut-off attachment contemplated by the present invention. Fig. 2 is a sectional elevation of the attachment with the parts set to be operated by a cooking utensil placed upon the stove. Fig. 3 is a similar view showing the automatic controlling means depressed by the cooking utensil, in which position of parts the flow of gas is turned on. Fig. 4 is a perspective view of the attachment complete. Fig. 5 is a vertical sectional view through the double valve and the parts associated therewith shown in normal position with the main cut-off valve open. Fig. 6 is a similar view showing the position occupied by the parts with the main cut-off valve closed or cut off.

Like reference-numerals designate corresponding parts in all the figures of the drawings.

In adapting the invention to gas-stoves no change whatever is required in any of the usual working parts thereof, as the attachment coöperates directly with the ordinary burner and the gas-supply pipe for supplying gas to the burner. Hence for illustrative purposes there is shown in the drawings a portion of an ordinary gas-stove, (designated by the numeral 1,) which stove includes in its general organization a burner 2, receiving its supply of gas through a burner-tube 3, having connection with a gas-supply pipe 4.

The present invention includes a main valve-casing 5, having oppositely-arranged ports 6 and $6^a$, coupled into the line of the burner-tube 3, said valve-casing thereby occupying the usual position of the ordinary gas-cock employed in connection with gas-stoves. The said valve-casing 5 is preferably of the tapered type, having an interior ground tapered valve-seat 7 extending the full length thereof and accommodating therein a tapered turning valve-plug 8, constituting the main cut-off valve and having a ground joint fit within the said valve-seat 7. The main turning cut-off valve 8 is provided with the oppositely-arranged gas-passages 9 and 10, designed to respectively coöperate with the opposite gas-ports 6 and 6ª of the casing. Both of the gas-passages 9 and 10 communicate with the gas-circulating chamber 11, formed in the top part of the valve or valve-plug 8, and the opening between the gas-passage 10 and the said gas-circulating chamber 11 is shaped to provide a beveled valve-seat 12, accommodating therein an auxiliary automatic cut-off valve 13, carried at the lower inner end of a reciprocatory valve-carrying stem 14, extending through an opening in the cap-piece 15, provided for the upper end of the cut-off-valve plug 8. The cap-piece 15 is suitably connected to the upper hollow part of the valve-plug 8, such as by the screw connection 16, shown in the drawings, and may be utilized to clamp in position a flexible sealing-diaphragm 17, secured to the valve-carrying stem 14 and extending across the recessed or hollow upper part of the valve-plug 8 to form a gas-tight cover for the gas-chamber 11.

A valve-operating handle 18 is rigidly connected to one side of the turning valve-plug 8, preferably near the top thereof, and arranged to work in a horizontal guiding-slot 19, provided in the casing 5, said handle 18 providing means whereby the flow of gas is controlled manually through the opening and closing of the valve 8. The opening and closing of the auxiliary automatic cut-off valve 13 are effected through the medium of automatic controlling means which include a valve-actuating spring 20, coiled upon the stem 14 and arranged within the top part of the valve-plug 8, the tension of said spring 20 being conveniently regulated through the medium of a tension-regulating sleeve 21, mounted in a threaded opening 22, provided in the cap-piece 15 of the valve 8.

The reciprocating valve-carrying stem 14 (constituting a part of the automatic valve-controlling means) is provided upon its exposed end portion with a lateral offset cam or wedge bearing-lip 23, beneath which is arranged a tappet-finger 24, carried by a rock-shaft member 25, journaled in suitable bearings 26 at the top of the valve-casing. This rock-shaft member is preferably of tubular form to adjustably receive therein an arm 27 of an angled valve-operating bracket 28, upon one member of which bracket is adjustably mounted a presser-foot 29. This presser-foot is held to any adjusted position upon the bracket 28 through the medium of a set-screw 30, and is provided at its upper end with a contact element or head 31, adapted to be disposed within the burner-opening so as to project above the plane of the stove-top, whereby the same presents itself for engagement by the cooking utensil or vessel when placed on the stove, as plainly shown in Fig. 3 of the drawings. The arm 27 of the valve-operating bracket is held fast to the rock-shaft member 25 by a set-screw 32. The adjustable mounting of the valve-operating bracket 28 provides for the convenient fitting thereof to stoves of different sizes and also to meet conditions wherein the burner is at variable distances from the front of the stove.

Under normal conditions it is desirable that the auxiliary automatic cut-off valve 13 will remain only partially closed within its seat 12, so that a small flow of gas may pass to the burner during the use of the stove, but when the cooking utensil or vessel may be temporarily removed therefrom. This is accomplished through the medium of a valve-adjuster, preferably in the form of a valve-adjusting screw 33, mounted in a threaded opening in the bottom portion of the valve-plug 8 and working beneath and against the valve 13. Also the screw 33 may be turned sufficiently to lift the valve 13 to an entirely inactive position should it become necessary or desirable to employ the main cut-off valve alone, especially in the event of derangement of the automatic controlling means. A closure-plug 34 is detachably fitted in the bottom of the main cut-off valve 8, so as to normally close in the recess below the screw 33; but it is readily removable to permit of access to said screw.

By reason of the cam or wedge form of the bearing-lip 23 it will be observed that when the main valve 8 is open the widest part of the lip 23 comes over the tappet-finger 24, thus holding the presser-foot 29 exposed through the burner-opening. When the valve 8 is turned off, the said presser-foot is permitted to fall to an inactive plane, as indicated in Fig. 6 of the drawings.

From the foregoing description it is thought that the construction, operation, and many advantages of the invention will be fully understood without further description.

Having thus described the invention, what is claimed as new is—

1. An automatic cut-off attachment for gas-stoves comprising a manually-operated main cut-off valve having a gas passage-way therethrough, an auxiliary valve carried by the main valve, valve-operating connections for the auxiliary valve, means for normally holding the auxiliary valve partially closed, and means for automatically setting said valve-operating connections in operative or inoperative position through the adjustment of the main valve.

2. An automatic cut-off attachment for gas-stoves comprising a manually-operated main cut-off valve having a gas passage-way therethrough, an auxiliary valve carried by the main valve, means for automatically operating the auxiliary valve, and a valve-adjusting screw mounted in the main valve and operating beneath the auxiliary valve.

3. An automatic cut-off attachment for gas-stoves comprising a valve-casing, a manually-operated main cut-off valve mounted in said casing and having a diaphragmed gas-chamber within the top portion thereof and also provided with oppositely-arranged gas-passages communicating with said chamber and in one of which passages is formed the valve-seat, a spring-actuated auxiliary valve arranged to work over said seat, and means for automatically operating the auxiliary valve.

4. An automatic cut-off attachment for gas-stoves comprising a manually-operated main cut-off valve, an auxiliary cut-off valve carried by the main valve, automatic valve-operating connections for the auxiliary valve, and means for setting said connections in operative and inoperative position through the adjustment of the main valve.

5. An automatic cut-off attachment comprising a valve-casing, a manually-operated main cut-off valve mounted in said casing, a spring-actuated auxiliary valve carried by the main valve and arranged to control the flow of gas therethrough, said auxiliary valve having a carrying-stem provided with an exterior cam or wedge bearing-lip, a valve-adjusting screw mounted in the main valve and operating beneath the auxiliary valve, and an adjustable valve-operating device including a bracket carrying an adjustable presser-foot, and a rock-shaft member carrying a tappet operating beneath said cam or wedge bearing-lip.

In testimony whereof I affix my signature in presence of two witnesses.

CLIFFORD BARGAMIN.

Witnesses:
A. M. PARKINS,
N. G. REYNOLDS.